United States Patent
Götz et al.

(10) Patent No.: US 10,396,682 B2
(45) Date of Patent: Aug. 27, 2019

(54) METHOD FOR OPERATING AN ELECTRICAL NETWORK

(71) Applicant: Dr. Ing. h.c. F. Porsche Aktiengesellschaft, Stuttgart (DE)

(72) Inventors: Stefan Götz, Forstern (DE); Malte Jaensch, Bietigheim-Bissingen (DE); Dirk Lappe, Karlsruhe/Hohenwettersbach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/087,527

(22) PCT Filed: Mar. 24, 2017

(86) PCT No.: PCT/EP2017/025059
§ 371 (c)(1),
(2) Date: Sep. 21, 2018

(87) PCT Pub. No.: WO2017/162341
PCT Pub. Date: Sep. 28, 2017

(65) Prior Publication Data
US 2019/0109545 A1    Apr. 11, 2019

(30) Foreign Application Priority Data
Mar. 24, 2016   (DE) .................. 10 2016 105 542

(51) Int. Cl.
*H02P 27/04* (2016.01)
*H02M 7/487* (2007.01)
(Continued)

(52) U.S. Cl.
CPC .............. *H02M 7/487* (2013.01); *B60L 1/00* (2013.01); *B60L 7/14* (2013.01); *B60L 15/007* (2013.01);
(Continued)

(58) Field of Classification Search
CPC .. H02M 1/36; H02M 2007/4835; H02M 7/49; B60L 7/14; B60L 15/007
(Continued)

(56) References Cited

U.S. PATENT DOCUMENTS 5,093,583 A    3/1992  Mashino et al.
5,982,645 A *  11/1999 Levran ................ H01F 27/2866
                                                    363/37
(Continued)

FOREIGN PATENT DOCUMENTS

DE    102012202867 A1    8/2013
DE    102015112513       2/2017
(Continued)

OTHER PUBLICATIONS

Goetz et al., "Modular Multilevel Converter with Series and Parallel Module Connectivity: Topology and Control", IEEE Transactions on Power Electronics, vol. 30, No. 1, Jan. 2015—pp. 203-215.
(Continued)

*Primary Examiner* — Rajnikant B Patel
(74) *Attorney, Agent, or Firm* — RatnerPrestia

(57) ABSTRACT

A method for operating an electrical network comprising a first subnetwork and a second subnetwork that are connected to one another via a transformer and are DC isolated from one another by said transformer, wherein a primary side of the transformer having a first number of turns is assigned to the first subnetwork and a secondary side of the transformer having a second number of turns is assigned to the second subnetwork, wherein the first subnetwork has a multilevel converter having a plurality of single modules, wherein each single module has an electrical energy store, wherein the multilevel converter provides at least one first incoming AC voltage that is modulated with at least one second incoming AC voltage, wherein a voltage resulting therefrom is pro-
(Continued)

vided to the transformer and is transformed by the transformer to an outgoing voltage that is provided to the second subnetwork.

14 Claims, 12 Drawing Sheets

(51) Int. Cl.
   *B60L 1/00*     (2006.01)
   *B60L 7/14*     (2006.01)
   *B60L 15/00*    (2006.01)
   *H02M 7/49*     (2007.01)
   *B60L 58/21*    (2019.01)
   *B60L 58/20*    (2019.01)
   *H02M 7/483*    (2007.01)

(52) U.S. Cl.
   CPC .............. *B60L 58/20* (2019.02); *B60L 58/21* (2019.02); *H02M 7/49* (2013.01); *B60L 2210/10* (2013.01); *B60L 2210/30* (2013.01); *B60L 2210/40* (2013.01); *H02M 2007/4835* (2013.01); *Y02T 10/645* (2013.01); *Y02T 10/7005* (2013.01); *Y02T 10/7061* (2013.01); *Y02T 10/7066* (2013.01); *Y02T 10/7216* (2013.01); *Y02T 10/7241* (2013.01)

(58) Field of Classification Search
   USPC ........ 363/16–17, 34–39, 71–76, 87–89, 127; 318/139, 800, 801
   See application file for complete search history.

(56) References Cited

U.S. PATENT DOCUMENTS

| | | | |
|---|---|---|---|
| 6,005,788 A * | 12/1999 | Lipo | H02M 7/49 363/71 |
| 8,860,380 B2 * | 10/2014 | Hasler | H02J 3/18 307/109 |
| 9,344,020 B2 * | 5/2016 | Inoue | H02M 7/483 |
| 2008/0197825 A1 * | 8/2008 | Siri | H02J 1/102 323/272 |
| 2010/0140003 A1 | 6/2010 | Saha et al. | |
| 2011/0198936 A1 | 8/2011 | Graovac et al. | |
| 2013/0106365 A1 | 5/2013 | Ang | |
| 2013/0128629 A1 * | 5/2013 | Clare | H02J 3/36 363/35 |
| 2013/0241472 A1 | 9/2013 | Feuerstack et al. | |
| 2013/0314046 A1 | 11/2013 | Feuerstack et al. | |
| 2014/0097804 A1 * | 4/2014 | Hasler | H02J 3/18 320/166 |
| 2014/0152089 A1 | 6/2014 | Manabe et al. | |
| 2014/0225432 A1 | 8/2014 | Geyer | |
| 2018/0212530 A1 | 7/2018 | Götz | |

FOREIGN PATENT DOCUMENTS

| | | | |
|---|---|---|---|
| JP | 5853094 | * | 12/1998 |
| JP | 5853094 B2 | | 2/2016 |
| WO | 2012107149 A1 | | 8/2012 |

OTHER PUBLICATIONS

International Search Report and Written Opinion for International Application No. PCT/EP2017/025059, dated Dec. 6, 2017—10 pages.

Goetz et al., "Control of Modular Multilevel Converter with Parallel Connectivity-Application to Battery Systems", (IEEE Transactions on Power Electronics, vol. 32, No. 11, Nov. 2017—pp. 8381-8392.

Goetz et al., "Sensorless Scheduling of the Modular Multilevel Series-Parallel Converter: Enabling a Flexible, Efficient, Modular Battery" (IEEE Applied Power Electronics Conference and Exposition (APEC), 2016—pp. 2349-2354.

Kouro et al., "Recent Advances and Industrial Applications of Multilevel Converters" (IEEE Transactions on Industrial Electronics, vol. 57, No. 8, Aug. 2010—pp. 2553-2580.

* cited by examiner

METHOD FOR OPERATING AN ELECTRICAL NETWORK

CROSS-REFERENCE TO RELATED APPLICATIONS

This U.S. national phase patent application claims priority to PCT International Patent Application No. PCT/EP2017/025059, filed Mar. 24, 2017, which claims priority to German Patent Application No. DE 102015105542.5, filed Mar. 24, 2016, the contents of each application being incorporated by reference herein in its entirety.

FIELD OF THE INVENTION

The invention relates to a method for operating art electrical network, to a multilevel converter and to a power supply system.

BACKGROUND OF THE INVENTION

An electrical network can have multiple energy sources that can be used to provide multiple loads connected to the electrical network with electric power. In this arrangement, it is additionally possible for the electrical network to be divided into multiple subnetworks that each have different associated energy sources and loads. The different subnetworks can have different voltages that can be used to operate the subnetworks, these different voltages having different amplitudes and/or different maximum values. Two subnetworks connected to one another in this case and having different voltages are connected to one another via a voltage transformer, for example a DC voltage transformer or an AC voltage transformer.

The document U.S. Pat. No. 5,093,583 A, which is incorporated by reference herein, discloses an electrical system for a motor vehicle that comprises a low voltage network and a high voltage network. In this case, a generator produces a low voltage that feeds the low voltage network and a transformer of the motor vehicle. This transformer is configured to convert the low voltage into a high voltage that can also be used to operate loads in the high voltage network in parallel with loads in the low voltage network.

A method for supplying an electric motor with an AC current is described in the document US 2010 0 140 003 A1, which is incorporated by reference herein. In this case, depending on the requirement of the electric motor, the latter is provided with a voltage by means of at least one pulse width modulation, a selection being made between multiple types, for example three types, of a respective pulse width modulation to be used.

The document US 2013 0 106 365 A1, which is incorporated by reference herein, discloses the practice of charging an energy store of an electric motor vehicle via an external energy source. In this case, it is possible to charge the energy store of the motor vehicle using the external energy source in DC isolated or direct fashion.

A fuel cell system by means of which electrical loads are able to be supplied with electric power is described in the document US 2014 0 152 089 A1, which is incorporated by reference herein. In this case, a respective fuel cell and a respective electrical load have an inverter arranged between them that is configured to produce a polyphase high voltage needed by the respective load, undesirable noise being avoided by selecting a difference for phases of the high voltages.

The document US 2014 0 225 432 A1, which is incorporated by reference herein, discloses a current transformer that comprises three coils and is configured for exchanging electric power between various voltage sources and voltage networks of an electric motor vehicle.

SUMMARY OF THE INVENTION

Against this background, it was an object of the present invention to provide a method and a device that can be used to produce voltages having different maximum values, wherein a first load, which is able to be provided with a first voltage having a first value, is not interfered with by a second voltage having a second value that is able to be provided to a second load.

This object is achieved by means of the independent method claim, the independent multilevel converter claim and the power supply system claim. Configurations of the method, the multilevel converter and the power supply system are obtained from the dependent patent claims and the description.

The method according to the invention is provided for operating an electrical network comprising a first subnetwork and a second subnetwork that are connected to one another via at least one transformer and are DC isolated from one another by said transformer. In this case, at least one primary side of the at least one transformer having a first number of turns is assigned to the first subnetwork and at least one secondary side of the at least one transformer having a second number of turns is assigned to the second subnetwork. The first subnetwork has a multilevel converter having a plurality of single modules, wherein each single module has an electrical energy store. The multilevel converter provides and/or produces at least one first or primary AC voltage that is modulated with at least one second or secondary AC voltage, wherein accordingly at least one resultant AC voltage is formed. The at least one AC voltage resulting from a modulation of this kind is provided to the at least one transformer and transformed by the latter into accordingly at least one outgoing AC voltage that is provided to the second subnetwork.

This means that if, by way of example, three first AC voltages are provided and are each modulated with a second AC voltage, three resultant AC voltages are formed and are provided to three transformers, wherein one resultant AC voltage is provided to one transformer of the three transformers and is transformed into an outgoing AC voltage by the respective transformer, so that ultimately, in this exemplary case, three outgoing AC voltages are provided to the second subnetwork.

Usually, the first number of turns on the primary side of the at least one transformer is greater than the second number of turns on the secondary side. Therefore, a maximum amplitude of the at least one resultant AC voltage of the first subnetwork and therefore of a high voltage network is greater than an amplitude of the at least one outgoing AC voltage for the second subnetwork, which is accordingly configured as a low voltage network.

The method has provision for the at least one first AC voltage to have an amplitude having a first value and a frequency having a first value, and for the at least one second AC voltage to have an amplitude having a second value and a frequency having a second value. In this case, the first value of the amplitude of the at least one first AC voltage is usually set so as to be greater than the second value of the amplitude of the second AC voltage. The first value of the frequency of the at least one first AC voltage is usually set to be less than the second value of the frequency of the at least one second AC voltage. Alternatively, it is possible for the first value of the amplitude of the at least one first AC voltage to be less-tan the second value of the second AC voltage. Moreover, it is also possible for the value of the frequency of the at least one first AC voltage to be greater than the value of the frequency of the at least one second AC voltage.

In one configuration, the at least one first AC voltage is modulated with the at least one second AC voltage between a connection of the multilevel converter for a load in the first subnetwork and a reference point of the multilevel converter. In this case, the reference point chosen is a star point of the multilevel converter, for example.

Usually, the at least one second AC voltage is modulated, by implementing a type of amplitude modulation, onto the at least one first AC voltage and is therefore added thereto, wherein the resultant AC voltage is provided as a sum of the at least one first AC voltage and the at least one second AC voltage.

Additionally, it is possible for the multilevel converter to provide multiple, for example three, first or primary AC voltages or phases phase shifted relative to one another that are modulated with the at least one second or secondary AC voltage. In this case, there is provision for each of the first AC voltages to be modulated with in each case a second AC voltage able to be set on a phase-individual basis. Alternatively, all of the first AC voltages are modulated with the same second AC voltage.

In one configuration, a respective instance of the multiple first AC voltages phase shifted relative to one another is provided by means of a full tap and/or a partial tap from a respective section formed by a combination of multiple interconnected single modules with reference to a reference point and is modulated in each case with the at least one second AC voltage.

In this case, it is possible for a respective one of the multiple first AC voltages to be modulated with the at least one second AC voltage between a respective phase connection of the multilevel converter for a load in the first subnetwork and the reference point of the multilevel converter.

In one configuration, the at least one first AC voltage or phase is modulated with the at least one second AC voltage and therefore excited. The modulation performed in this case is modulated relative to the reference point of the multilevel converter, for example between a respective connection of the multilevel converter and the reference point, with a respective connection being provided for the at least one first AC voltage or phase. If the multilevel converter is used to produce multiple first AC voltages and therefore phases, the respective modulation with the at least one second AC voltage can be compensated for.

In one configuration, a respective resultant AC voltage from the multiple resultant AC voltages is provided to a respective transformer from accordingly multiple transformers, which transforms the respective resultant AC voltage into a respective outgoing AC voltage.

In this case, a respective outgoing AC voltage from the accordingly multiple outgoing AC voltages is converted into a respective outgoing DC voltage via a respective rectifier from accordingly multiple rectifiers, wherein the respective outgoing DC voltages are converted into a total voltage by interconnecting the multiple rectifiers among one another.

The multilevel converter comprising multiple single modules having energy stores is likewise configured as an energy store or energy source that is used to provide loads in the subnetworks with AC voltages having different frequencies. In this case, loads in the first subnetwork are provided with AC voltages having amplitudes and frequencies that are each adapted according to need.

Additionally, loads in the second subnetwork are provided with the at least one outgoing AC voltage via the at least one transformer on the basis of the at least one resultant AC voltage, wherein the frequency and amplitude of said at least one outgoing AC voltage are dependent on the frequency and amplitude of the at least one resultant AC voltage and on a ratio of the two numbers of turns of the at least one transformer.

Moreover, the multilevel converter has multiple distributed single modules, wherein an energy store on a respective single module provides a DC voltage or an AC voltage, wherein if a respective energy store provides a DC voltage, this DC voltage is converted into an AC voltage by the multilevel converter.

The multilevel converter according to the invention is able to be arranged in an electrical network comprising a first subnetwork and a second subnetwork that are able to be connected to one another via at least one transformer and to be DC isolated from one another by said transformer, wherein a primary side of the at least one transformer having a first number of turns is able to be assigned to the first subnetwork and a secondary side of the at least one transformer having a second number of turns is able to be assigned to the second subnetwork. The multilevel converter is able to be arranged in the first subnetwork and has a plurality of single modules, wherein each single module has an electrical energy store. The multilevel converter is configured to provide and/or produce at least one first AC voltage and to modulate it with at least one second AC voltage, wherein the at least one transformer is able to be provided, by the multilevel converter, with accordingly at least one resultant AC voltage that is able to be transformed by the at least one transformer into accordingly at least one outgoing AC voltage and is able to be provided to the second subnetwork.

The multilevel converter has an associated control unit that is configured to set values of at least one physical parameter, for example an amplitude and/or a frequency, of the at least one first AC voltage and/or of the at least one second AC voltage. According to definition, this control unit is configured as a component of the multilevel converter.

Additionally, at least two single modules of the multilevel converter, normally all of the single modules, are configured equally.

The multilevel converter is configured to produce or provide the at least one first AC voltage from a single voltage from an energy source or an energy store of at least one single module, wherein multiple first AC voltages are overlaid on one another and/or are phase shifted over time relative to one another.

Moreover, the multilevel converter is configured to connect at least two single modules in series and/or in parallel with one another, and to provide the at least one first AC voltage from a combination of single voltages of the at least two single modules able to be combined with one another. In this case, individual single modules are switched on or switched off according to need.

The multilevel converter has multiple, for example three, sections, wherein each section has a combination of multiple interconnected single modules, usually configured equally, wherein each section is able to produce a respective first AC voltage and hence phase. The value of the amplitude of the respective first AC voltage is set on the basis of which single module in a respective section is switched on or off and how multiple switched-on single modules in the section are connected in series and/or in parallel with one another.

In one configuration, the multilevel converter is configured to use the multiple sections to provide multiple first AC voltages phase shifted relative to one another and to modulate each of them with the at least one second AC voltage to produce accordingly multiple resultant AC voltages.

In this case, the multilevel converter ma further be configured to modulate a respective AC voltage from the multiple first AC voltages with the at least one second AC voltage between a respective phase connection of the multilevel converter for a load in the first subnetwork and a reference point of the multilevel converter.

In this case, the reference point is consistent with a star point of the multilevel converter.

Furthermore, in a further configuration, the multilevel converter is configured to provide a respective resultant AC voltage from the multiple resultant AC voltages to a respective transformer from accordingly multiple transformers, which transforms the respective resultant AC voltage into a respective outgoing AC voltage.

The multilevel converter has at least one associated additional energy source or at least one associated additional energy store configured to provide the at least one second AC voltage.

The energy stores of the single modules are normally configured as DC voltage sources. The multilevel converter has at least one converter that is configured to convert a single voltage from an energy store of at least one single module, configured as a DC voltage, into an AC voltage and to provide the at least one first AC voltage therefrom.

Usually, the at least one second high-frequency AC voltage is modulated onto the at least one first low-frequency AC voltage.

Additionally, the primary side of the at least one transformer is excited by the multilevel converter, i.e. by the at least one resultant AC voltage provided by the multilevel converter.

The at least one transformer has a high-pass filter characteristic, wherein the at least one transformer takes into consideration, and transforms into the at least one outgoing AC voltage, only components of the resultant AC voltage that are at least as high as a cutoff frequency.

Further, at least one capacitor can be electrically connected in series with the primary side of the at least one transformer in order to form a series resonance together with the load-dependent effective impedance of the primary side of the at least one transformer, influenced inter alia by the inductance, the internal resistance and the transmitted power of the transformer. On the basis of a pronounced minimum for the impedance of the combination above the feed frequency close to resonance of the at least one transformer and of the at least one capacitor, the series resonance permits maximum power transmission at this very frequency, whereas impedance rises and transmitted power accordingly falls for lower and higher frequencies. The frequency filter arising on the basis of the at least one capacitor can be utilized in two different ways according to the invention. Firstly, said frequency can be shaped, by choosing the capacitance of the at least one capacitor and the electrical properties of the at least one transformer, for example inductance, such that the impedance is much higher for a first low-frequency AC voltage than for a second high-frequency AC voltage, for example. Preferably, the impedance for the first, low-frequency AC voltage is greater at least by a factor of 100, particularly preferably at least by a factor of 10 000, than the impedance of the second, high-frequency AC voltage. Secondly, the power transmission from a second, high-frequency AC voltage via the at least one transformer can be controlled or regulated by means of effective changes to the frequency of the second, high-frequency AC voltage. Control or regulation of the power transmission by means of frequency can be used for influencing at least one voltage value and/or at least one current value on a secondary side of the at least one transformer, for example. The control and/or regulation can use not only the frequency of the second, high-frequency AC voltage but also the amplitude of the second, high-frequency AC voltage as a second degree of freedom.

The power supply system according to the invention comprises an electrical network comprising a first subnetwork and a second subnetwork that are connected to one another via at least one transformer and are DC isolated from one another by said transformer, wherein a primary side of the at least one transformer has a first number of turns and is associated with the first subnetwork, and wherein a secondary side of the at least one transformer has a second number of turns and is associated with the second subnetwork. The first subnetwork comprises a multilevel converter having a plurality of single modules, wherein each single module has an electrical energy store. The multilevel converter is configured to provide and/or produce at least one first AC voltage and to modulate it with at least one second AC voltage or input voltage, wherein accordingly at least one resultant AC voltage is formed. The at least one AC voltage resulting therefrom is able to be provided to the at least one transformer. The at least one transformer is configured to transform the at least one resultant AC voltage into accordingly at least one outgoing AC voltage or output voltage and to provide it to the second subnetwork.

In one configuration, the first number of turns of a coil on the primary side of the at least one transformer is greater than the second number of turns of a coil on the secondary side of the at least one transformer. Alternatively, it is conceivable for the first number of turns of the coil on the primary side to be less than the second number of turns of the coil on the secondary side.

The power supply system is able to be arranged in a motor vehicle, for example.

Additionally, in one possible configuration, the first subnetwork is able to be assigned an electrical machine, having multiple phases, as a load, wherein the multilevel converter is configured to provide each phase with a respective first AC voltage. The multiple phases can each be supplied with a first AC voltage, for example, said AC voltages having a phase offset relative to one another.

In one configuration, the presented multilevel converter according to the invention is configured as a component of the presented power supply system according to the invention, wherein the multilevel converter and/or the power supply system is able to be used to supply loads in the network, i.e. at least one load in the first subnetwork, which is usually configured as an electrical machine, and at least one load in the second subnetwork, with electric power. In one configuration, there is provision in this case for an electrical machine of this kind to be operated as an electric motor, which is used to convert electric power into mechanical energy. Alternatively or additionally, it is also possible for this electrical machine to be operated as an electrical generator according to requirements.

In one configuration, the power supply system further comprises at least one rectifier configured to convert the at least one outgoing AC voltage into accordingly at least one DC voltage.

In a further configuration, the power supply system according to the invention is configured to provide multiple first AC voltages and to modulate each of these multiple first AC voltages with at least one second AC voltage to produce accordingly multiple resultant AC voltages, wherein the power supply system comprises accordingly multiple transformers, wherein a respective transformer is configured to transform a respective one of the multiple resultant AC voltages into a respective outgoing AC voltage, and wherein the power supply system further comprises accordingly multiple rectifiers connected downstream of the multiple transformers, wherein a respective rectifier is configured to convert a respective outgoing AC voltage from a transformer into a respective DC voltage, wherein the multiple rectifiers are interconnected among one another such that they can be used to convert the respective DC voltages into a total voltage. The interconnection of the rectifiers among one another is able to be adjusted or realized on the basis of the desired total voltage.

If the power supply system and the network are provided for a motor vehicle, the network is also configured as and/or can be called a vehicle electrical system of the motor vehicle. Accordingly, the two subnetworks are configured as and/or can be called vehicle electrical subsystems of the motor vehicle, which are able to be operated at voltages whose amplitudes or maximum values are of different magnitude. In this case, there is additionally provision for the electrical machine, as a load in the first subnetwork whose voltage has an amplitude having a high value, provided that it is operated as an electric motor, to be configured for driving or moving the motor vehicle. If the electrical machine, as an alternative, is operated as an electrical generator, it is able to be used to convert mechanical energy of the motor vehicle, for example in a regenerative mode, into electric power, electric power provided in this process being able to be stored in an energy store of the electrical network. A load in the second subnetwork whose voltage has an amplitude having a low value is configured for performing a control function of the motor vehicle, for example.

The presented method according to the invention is able to be performed using the multilevel converter and/or the power supply system, wherein the method is able to be piloted and therefore controlled and/or regulated using the multilevel converter and/or the power supply system.

In one configuration, excitation of at least one primary side and hence of a primary coil or winding of the at least one transformer is produced by the multilevel converter, which is also configured as and/or able to be called a high-voltage multilevel converter, for example, if the first subnetwork is able to be operated at a higher voltage than the at least one second subnetwork. The value of the frequency of the at least one first AC voltage provided by the multilevel converter and able to be used to supply power to the load in the first subnetwork is normally comparatively low and is no more than two kilohertz. By contrast, the frequency of the at least one second AC voltage used for modulating the at least one first AC voltage is greater than the value of the frequency of the at least one first AC voltage.

The multilevel converter is configured as a modular multilevel converter (MMC) or MMSPC, for example. A multilevel converter configured as an MMSPC is described in the document "Modular Multilevel Converter with Series and Parallel Module Connectivity: Topology and Control." (IEEE Transaction on Power Electronics, vol. 30, no. 1, pp. 203-215, 2015, doi: 10.1109/TPEL.2014.2310225) by S. M. Goetz, A. V. Peterchev and T. Weyh, in the document "Sensorless scheduling of the modular multilevel series-parallel converter: enabling a flexible, efficient, modular battery" (IEEE Applied Power Electronics Conference and Exposition (APEC), doi: 10.1109/APEC.2016.7468193) by S. M. Goetz, Z. Li, A. V. Peterchev, X. Liang, C. Zhang and S. Lukic and in the document "Control of Modular Multilevel Converter with Parallel Connectivity—Application to Battery Systems" (IEEE Transactions on Power Electronics, doi: 10.1109/TPEL.2016.2645884) by S. M. Goetz, Z. Li, X. Liang, C. Zhang, S. Lukic and A. V. Peterchev, all of which are incorporated by reference herein. Various multilevel converters configured as an MMC are depicted in detail in the document "Recent Advances and Industrial Applications of Multilevel Converters" (IEEE Transactions on Industrial Electronics, vol. 57, no. 8, pp. 2553-2580, 2010, doi: 10.1109/TIE.2010.2049719) by S. Kouro, M. Malinowski, K. Gopakumar, J. Pou, L. G. Franquelo, B. Wu, J. Rodriguez, M. A. Perez and J. I. Leon, which is incorporated by reference herein.

Normally, the at least one first AC voltage to be produced has a high level of dynamics. Usually, the value of the amplitude of the at least one first AC voltage is several orders of magnitude greater than the value of the amplitude of the at least one second AC voltage. By combining multiple first AC voltages overlaid by the multilevel converter, what is known as frequency multiplexing is possible for the first AC voltages, the first AC voltages combined with one another in such a manner being provided for the purpose of supplying power to the load in the first subnetwork from the multilevel converter.

A high-pass filter characteristic of the at least one transformer is able to be set by selecting a value of an inductance of at least one of the two coils or of the transformer, the inductance of the respective coil being dependent on its number of turns.

The excitation of the at least one transformer is set by the value of the frequency and/or the amplitude of the applicably at least one resultant AC voltage provided by the multilevel converter from the modulation. In this case, at least the amplitude and/or frequency of the first AC voltages is matched to requirements of the load in the first subnetwork. For the modulation to be performed by the multilevel converter, a type of amplitude modulation is performed. This modulation to be performed is able to be performed just for a first AC voltage and hence a first phase or for multiple first AC voltages and hence for multiple phases, compensation for the modulation being possible in the latter case.

In one configuration, the secondary side of the at least one transformer is connected to at least one rectifier and hence possibly a topology comprising multiple rectifiers, at least one load in the second subnetwork again being connected to the at least one rectifier, with the at least one outgoing AC voltage provided by the at least one transformer being converted into a DC voltage by the at least one rectifier. The at least one rectifier is usually configured to be active or passive and normally has at least one DC control stage, configured as buck, boost or buck-boost stage, for example. The topology formed from the at least one rectifier is in an at least single-pulse or multipulse, for example single-pulse to twelve-pulse, configuration. For the purpose of actively regulating the at least one rectifier, a semiconductor chip configured as a field effect transistor (FET) can be used, for example. For the purpose of passive regulation, at least one diode can be used, for example. A rectifier having an inverter, for example for an output of 100 V or 240 V, is also conceivable.

In one possible embodiment of the method, the multilevel converter and/or the power supply system, there is provision for the first subnetwork to be configured as a high voltage supply network (for example >60 V, preferably >200 V) and for the second subnetwork to be configured as a low voltage supply network (for example <60 V). In this case, the second subnetwork has, in one configuration, at least one energy store of its own, for example a capacitor and/or a battery. In this case, an average power requirement of the first subnetwork is higher by a multiple, for example a factor of 5, than the average power requirement of the second subnetwork. If the power supply system and hence the electrical network is used for a motor vehicle, the average power requirement of the second subnetwork at an average voltage of 12 V, 24 V, 48 V, 400 V or 800 V, for example, is 1 to 5 kW, the voltage levels of power supply systems in automobiles typically permitting a range of a few volts around the rated voltage, as can be inferred from the technical standards literature (see LV 124, VDA 320 and LV 124). By contrast, the power requirement of the first subnetwork is 20 kW to 400 kW, for example, for driving the motor vehicle to be driven, depending on the configuration of said motor vehicle.

The modulation to be performed using the multilevel converter involves the at least one second AC voltage being used to feed additional power into the first subnetwork and, at the same time, to add it to dynamic power regulation of the first subnetwork. So that a present power of the first subnetwork, which power is obtained from an actual target current or target voltage profile on the basis of the at least one first AC voltage, follows a present control target, said power is consistent, merely on temporal average, with the power requirement of the second subnetwork and hence its loads and/or energy stores. These two conditions from an instantaneous power requirement of the first subnetwork and an average power of the second subnetwork determine two degrees of freedom from a degree of the modulation to be performed and a degree of the power of a target voltage or target current profile.

In one possible configuration, the modulation for exciting the transformer in the first subnetwork is not visible to the at least one load in the first subnetwork, for example at least one electrical machine for driving the motor vehicle. Electrostatic loading of the loads in the first subnetwork is reduced by eliminating high-frequency components of the at least one resultant AC voltage in the first subnetwork. This relates, by way of example, to insulation of the at least one load configured as an electrical machine, which defines the service life of said load, inter alia. In one configuration, the degrees of freedom of the multilevel converter as a physical circuit are used such that the modulation is performed relative to a reference point of the physical circuit or of the multilevel converter. In this case, this reference point is consistent with a star point of the usually polyphase multilevel converter, for example. The modulation in this case is performed between at least one connection of a phase of the load, for example the polyphase electrical machine, and the reference point, for example. If the load has at least one star point, i.e. one star point or multiple star points, which is the case for a three-phase star winding of the electrical machine, for example, said electrical machine cannot be connected to the reference point. Instead, the modulation is performed in parallel at other connections for phases of the load, the modulation being present just between the connections of the phases and the reference point, but not between connections of the phases of the load. In this case, the reference point is used as a connection for the at least one transformer.

The presented multilevel converter is able to be used to provide at least one resultant AC voltage that has low distortion, thus avoiding interference from other electrical devices. Inside the first subnetwork, electric power provided by the multilevel converter is used by the electrical machine for driving the motor vehicle. In this case, it is possible to operate the electrical machine in a voltage-controlled manner from the multilevel converter.

The multilevel converter is configured, by way of example, as a neutral point clamped (NPC) converter, which has a neutral conductor at a star point, as a flying capacitor, as a modular multilevel converter or as an MMSPC that is used to provide multiple voltages, for example AC or three-phase voltages, that are able to be produced for at least one electrical machine for driving a motor vehicle. A voltage of this kind provided for supplying power has for the most part a value in the high voltage range of greater than 60 volts, usually greater than 200 volts, and is normally fed from multiple energy stores, or high voltage stores. At least one output of the multilevel converter is DC isolated from the at least one high voltage store. If the multilevel converter has multiple outputs, these are likewise DC isolated from one another.

The first subnetwork, which has the multilevel converter, able to be used to supply the electrical machine with power, the first subnetwork being configured as and/or able to be called a high voltage system. By contrast, the second subnetwork is configured as and/or able to be called a low voltage system, which is able to supply further loads, for example lighting devices, ancillary units, pilot or control modules or communication devices of the motor vehicle, with electric power. The second subnetwork has a rated voltage of 12 V, 24 V or 48 V (with the permitted ranges of fluctuation from the technical standardization literature, for example LV 124 and VDA 320), for example. By contrast, the first subnetwork has substantially higher voltages of 110 V, 240 V, 400 V or 800 V, for example.

All subnetworks are DC isolated from one another via the at least one transformer, so that possible semiconductor damage in the first subnetwork cannot produce a conductive connection to the second subnetwork and hence a life-threatening contact voltage, for example. The multilevel converter used to provide the electric power has a low weight and requires only a small installation space. The multilevel converter can be used to implement a DC isolating converter function with at least one converter. In one configuration, the, for example, modular multilevel converter is configured as an M2SPC (modular multilevel parallel/serial converter) and comprises capacitors and/or batteries as multiple energy stores or components of the single modules of the multilevel converter.

The multilevel converter comprising multiple single modules is used as a central energy store of the power supply system, the multilevel converter being able to be used to produce a high voltage inside the first subnetwork. Starting from this first high voltage of the multilevel converter, the at least one transformer is used to provide a comparatively low voltage for the second subnetwork, these two subnetworks additionally being DC isolated via the at least one transformer. The voltage provided by the multilevel converter is subject only to minor fluctuations. The multilevel converter renders multiple batteries dynamically reconfigurable as energy stores and hence also able to be used for a motor vehicle.

In one configuration, the usually modular multilevel converter is used to produce the AC voltage for the first subnetwork, which has the high value of the voltage, from multiple energy stores of the single modules, which are configured as DC voltage sources, for example. Instead of a converter that can otherwise be used, the second subnetwork is connected to the first subnetwork via the at least one transformer in the presented power supply system, with an exchange of energy being possible between the two subnetworks. The at least one transformer is supplied with electric power using the usually low second incoming AC voltage modulated onto the first AC voltage. This second AC voltage is modulated onto at least one phase, normally all phases, of the multilevel converter. A reference point that can be suitably selected in this case makes it possible to prevent the modulated second AC voltage from influencing operation of the electrical machine.

Further advantages and configurations of the invention are obtained from the description and the accompanying drawings.

It goes without saving that the features cited above and those yet to be explained below are usable not only in the respectively indicated combination but also in other combinations or on their own without departing from the scope of the present invention.

BRIEF DESCRIPTION OF THE DRAWINGS

The invention is depicted schematically on the basis of embodiments in the drawings and is described schematically and in detail with reference to the drawings.

FIGS. 1b and 1c are a phase gating controlled variable average voltage graph and a three-step pulse width modulation controlled variable average voltage graph, respectively, of voltages produced by the circuit of FIG. 1a.

DETAILED DESCRIPTION OF THE INVENTION

Figure 1A:
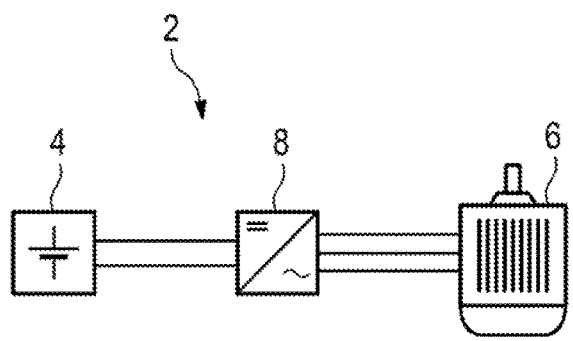
FIG. 1a shows a schematic depiction of an electrical circuit known from the prior art.

The figures are described coherently and generally. Identical components have the same associated reference numerals.

The circuit 2 depicted schematically in FIG. 1a comprises an energy source 4 and a high voltage load 6, which are both connected via an inverter 8 configured to convert a DC voltage produced by the energy source 4 into an AC voltage and to provide it to the high voltage load 6.

Figure 1B:
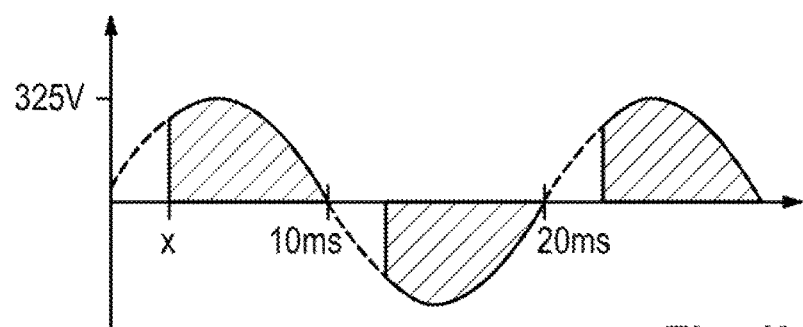
Figure 1C:
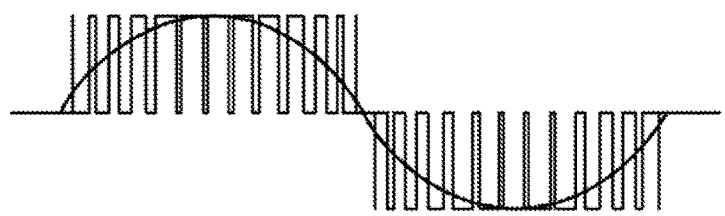

In this case, it is possible, as shown by the graph from FIG. 1b, to produce a variable average voltage by means of phase gating control. Alternatively, it is possible, as shown by the graph of FIG. 1c, to produce a variable average voltage by means of three-step pulse width modulation.

Figure 2A:
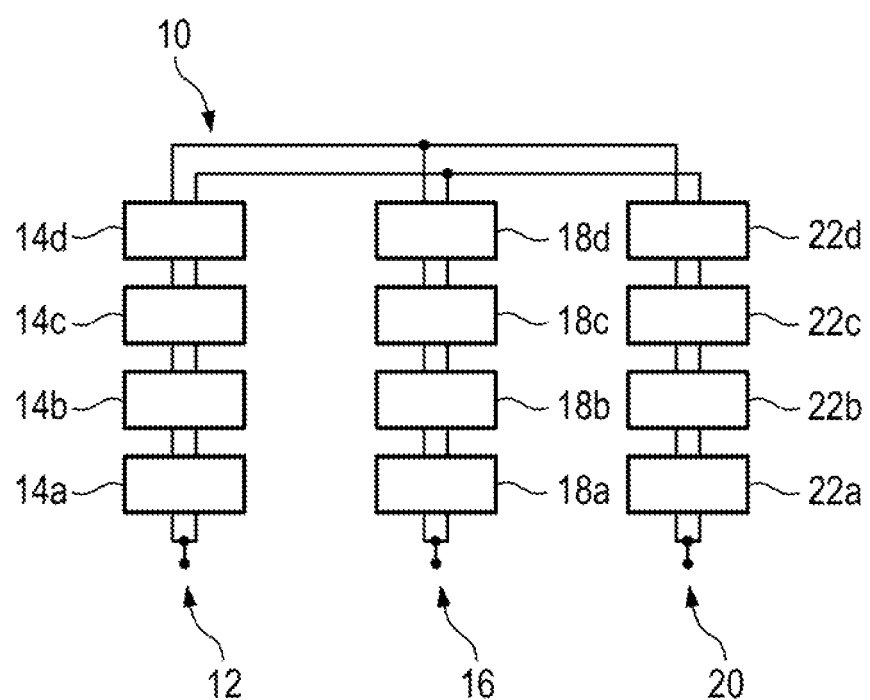
FIG. 2a shows a schematic depiction of a first embodiment of the multilevel converter according to the invention.

The first embodiment of the multilevel converter 10 according to the invention, depicted schematically in FIG. 2a, comprises a first section 12 containing four single modules 14a, 14b, 14c, 14d, a second section 16 likewise containing four single modules 18a, 18b, 18c, 18d and a third section 20 containing four single modules 22a, 22b, 22c, 22d. In this case, it is possible to also refer to each of the cited sections 12, 16, 20 as an arm of the multilevel converter 10. This, in this case modular, multilevel converter is configured, by way of example, as an MMC, MMSPC or Matroschka converter, which is described in the German patent application DE 10 2015 112 513. Each of the single modules 14a, 14b, 14c, 14d, 18a, 18b, 18c, 198, 22a, 22b, 22c, 22d comprises at least one energy store, for example a capacitor or a battery, which is why the multilevel converter 10 has multiple distributed energy stores. Energy stores of the single modules 14a, 14b, 14c, 14d of the first section are able to provide a first phase of an electrical machine with power in this case. A second phase of this electrical machine is able to be provided with electric power via the single modules 18a, 18b, 18c, 18d of the second section 16. Moreover, the single modules 22a, 22b, 22c, 22d of the third section 20 are able to provide a third phase of the electrical machine with power.

Figure 2B:
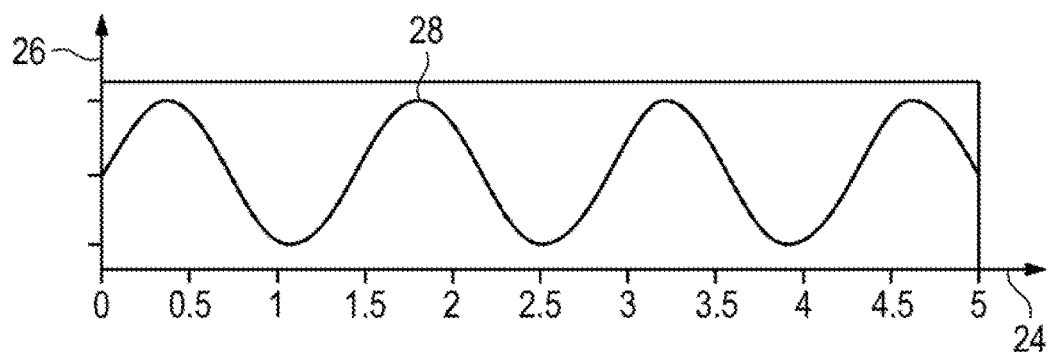
FIGS. 2b, 2c, and 2d are graphs in accordance with a first embodiment of the method according to the invention.
Figure 2C:
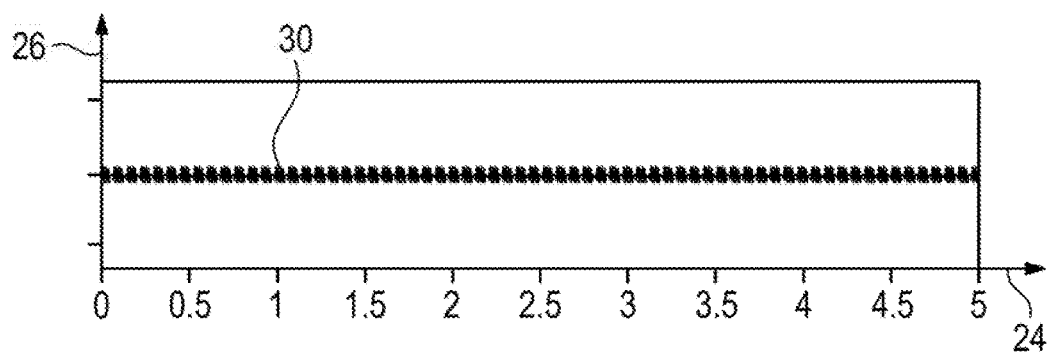
Figure 2D:
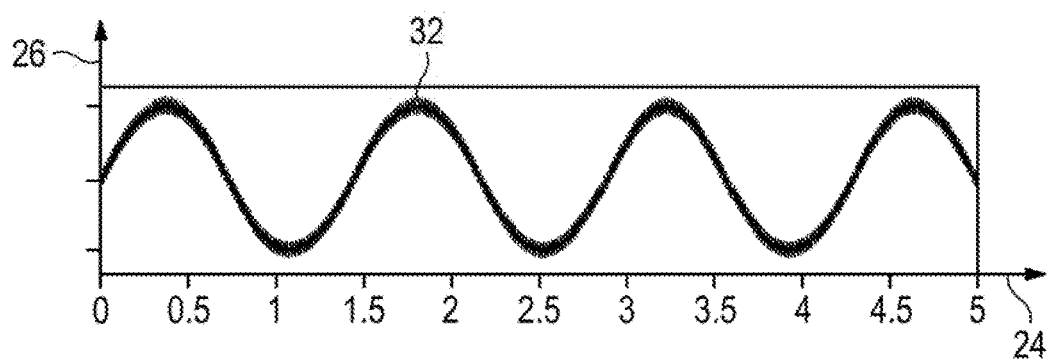

FIGS. 2b, 2c, 2d each comprise a graph having an abscissa 24, along which time is plotted, and an ordinate 26, along which values of a voltage are plotted. In this case, the first graph from FIG. 2b shows a profile 28 of a first AC voltage needed by a load, in this case the electrical machine. In this situation, there is provision for this machine to be able to be connected directly to the multilevel converter 10 inside a first subnetwork, which is not depicted further. A further load needing an AC voltage having a lower value than the first load in the first subnetwork is arranged in a second subnetwork, not depicted further, that is able to be connected to the first subnetwork via at least one DC isolating transformer.

A profile 30 of the second AC voltage is shown in the second graph from FIG. 2c, a comparison of the graphs from FIGS. 2b and 2c showing that the first AC voltage has a higher amplitude than the second AC voltage. By contrast, the frequency of the second AC voltage has a higher frequency than the first AC voltage. When an embodiment of the method according to the invention is performed, the second AC voltage having the profile 30, which is shown in the graph from FIG. 2c, is added to the first AC voltage having the profile 28 from FIG. 2b, with a resultant voltage having a profile 32, as depicted in FIG. 2d, being produced that is obtained as a summed voltage on modulation of the first AC voltage with the second AC voltage and is used to excite the primary side of the transformer.

Figure 3A:
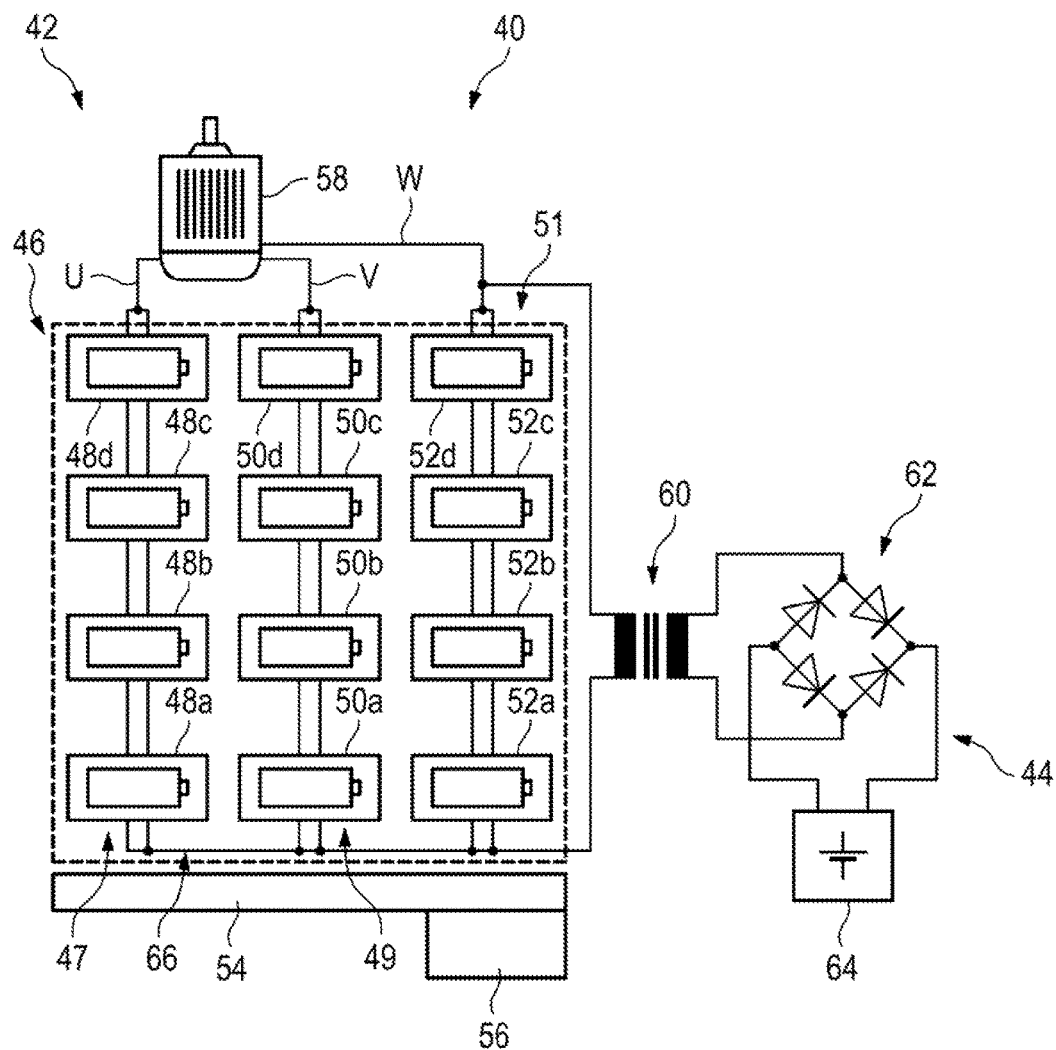
FIG. 3a shows a schematic depiction of a first embodiment of the power supply system according to the invention.

The first embodiment of the power supply system 40, schematically depicted in FIG. 3a, comprises a first subnetwork 42 and a second subnetwork 44. The first subnetwork 42 comprises a second embodiment of the multilevel converter 46 according to the invention, which in turn has three sections 47, 49, 51 or arms connected in parallel with one another, a first such section 47 having a first single module 48a, a second single module 48b, a third single module 48c and a fourth single module 48d. A second section 49 of the multilevel converter 46 has a first single module 50a, a second single module 50b, a third single module 50c and a fourth single module 50d. Moreover, the multilevel converter 46 comprises a third section 51 having a first single module 52a, a second single module 52b, a third single module 52c and a fourth single module 52d. In this arrangement, all of the single modules 48a, 48b, 48c, 48d, 50a, 50b, 50c, 50d, 52a, 52b, 52c, 52d each have an energy store configured as a battery or as a capacitor.

Additionally, the multilevel converter 46 comprises a control unit 54 and a further energy store 56. A respective section 47, 49, 51 of the multilevel converter 42 is associated with one phase from a total of three phases U, V, W of an electrical load 58, which is configured as an electrical machine in this case.

During operation of the multilevel converter 46, a value of an amplitude of a first AC voltage, which is able to be provided to a respective phase U, V, W of the load 58, is set via the control unit 54. In this case, the first section 47 having the single modules 48a, 48b, 48c, 48d is associated with a first phase U. The second section 49 having the single modules 50a, 50b, 50c, 50d is associated with a second phase V of the load 58. Moreover, the third section 51 having the single modules 52a, 52b, 52c, 52d is associated with the third phase W of the load 58.

All of the single modules 48a, 48b, 48c, 48d, 50a, 50b, 50c, 50d, 52a, 52b, 52c, 52d are configured in the same way and each have an energy store of the same type. Depending on what value the amplitude of the AC voltage, which is able to be provided to a respective phase U, V, W, is supposed to have, the control unit 54 activates at least one single module 48a, 48b, 48c, 48d, 50a, 50b, 50c, 50d, 52a, 52b, 52c, 52d, normally multiple single modules 48a, 48b, 48c, 48d, 50a, 50b, 50c, 50d, 52a, 52b, 52c, 52d, within a respective section 47, 49, 51, with for example at least two single modules 48a, 48b, 48c, 48d, 50a, 50b, 50c, 50d, 52a, 52b, 52c, 52d within a respective section 47, 49, 51 being connected in series and/or parallel with one another depending on the value of the providable amplitude of the AC voltage.

In this case, there is provision for the first subnetwork 42 to be operated at a voltage that is higher than a second voltage of the second subnetwork 44. The two subnetworks 42, 44 are in this case connected to one another via a DC isolating transformer 60, with the primary side of the transformer 60 being associated with the first subnetwork 42 and a secondary side of the transformer 60 being associated with the second subnetwork 44. Moreover, a rectifier 62, to which an energy store 64 is connected, is connected downstream of the transformer 60 inside the second subnetwork 44.

Additionally, a reference point 66, which in this case is at a minimum potential of the multilevel converter 46, is defined for the multilevel converter 46. On the one hand, the primary side of the transformer 60 is connected to the reference point 66 in this case. Moreover, the primary side is additionally connected to a connection point connecting the third section 51 of the multilevel converter 46 to the third phase W of the load 58.

When an embodiment of the method according to the invention is performed, the single modules 48a, 48b, 48c, 48d, 50a, 50b, 50c, 50d, 52a, 52b, 52c, 52d of the respective section 47, 49, 51 are used to provide a three-phase system.

In this arrangement, the first section 47 is associated with a first phase U, the second section 49 is associated with a second phase V and the third section 51 is associated with a third phase W of the load 58. In the method, a potential of the reference point 66 is not clearly stipulated, but rather is adjusted to a neutral point voltage of the three phases U, V, W as a virtual star point.

In one embodiment of the method, a second AC voltage is modulated onto a first AC voltage between the third phase W and the reference point 66 as a high-frequency harmonic that is used as an input for the transformer 60 for DC isolation, but at the same time is not visible to the load 58. This is achieved, by way of example, when voltages $V_{w-r}$, $V_{u-r}$ and $V_{v-r}$ between a respective phase U, V, W and the reference point 66 are identical, the following applying to differences in voltages between two respective phases U, V, W: $V_{u-v}=V_{u-r}-V_{v-r}$, $V_{u-w}=V_{u-r}-V_{w-r}$ and $V_{u-w}=V_{u-r}-V_{w-r}$.

Integrated DC isolated supply of power to loads in the second subnetwork 44 is made possible via the transformer 60 using the multilevel converter 46, which in this case is configured as a three-phase MMSPC.

Figure 3B:
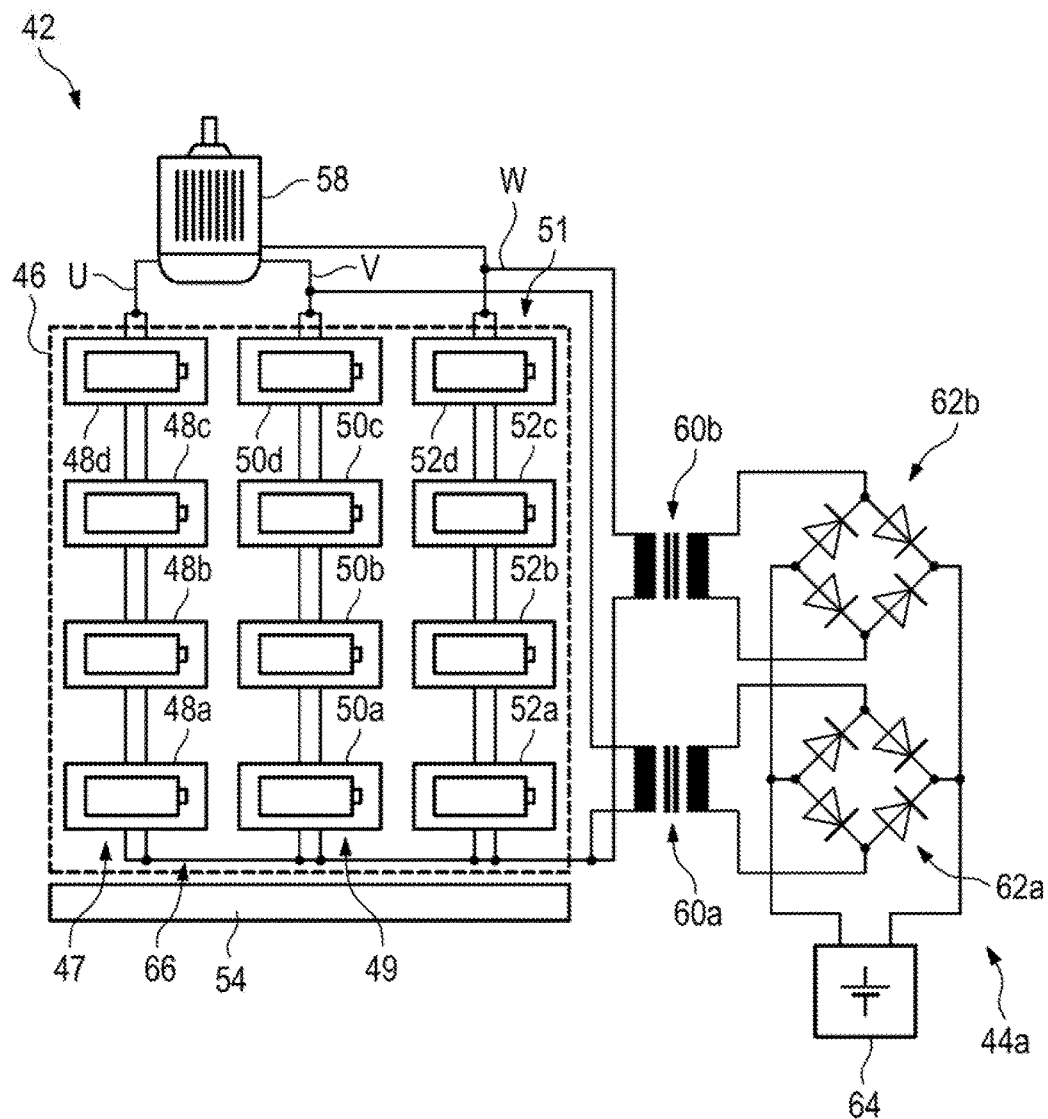
FIG. 3b shows a schematic depiction of a second embodiment of the power supply system according to the invention.

The second embodiment of the power supply system according to the invention, depicted schematically in FIG. 3b, comprises a first subnetwork 42 and a second subnetwork 44a. The first subnetwork 42 comprises a multilevel converter 46, which is configured to be of largely identical design to the multilevel converter 46 from FIG. 3a. The two subnetworks 42, 44a are in this case connected to one another via two DC isolating transformers 60a, 60b. In this case, the primary side of the transformer 60a is associated with the first subnetwork 42 and the secondary side of the transformer 60a is associated with the second subnetwork 44a. The primary side of the transformer 60b is likewise associated with the first subnetwork 42 and the secondary side of the transformer 60b is accordingly likewise associated with the second subnetwork 44a. Moreover, a rectifier 62a is connected downstream of the transformer 60a inside the second subnetwork 44a. A rectifier 62b is connected downstream of the transformer 60b inside the second subnetwork 44a. The rectifiers 62a, 62b are in this case connected in parallel with one another and connected to an energy store 64. Alternatively, it is also conceivable for the rectifiers 62a, 62b to be connected in series with one another. A connection in series is preferably used for producing voltages of the second subnetwork 44a in the high voltage range (>60 V). The interconnection of the rectifiers 62a, 62b among one another is provided on the basis of what DC voltage is supposed to be provided to the energy store 64 or what energy requirement there is for one or more loads in the second subnetwork, which are not depicted in this case.

Additionally, as also depicted in FIG. 3a, a reference point 66, in this case a star point, is defined for the multilevel converter. The primary side of the transformer 60a is in this case connected firstly to the reference point 66 and secondly to a phase connection of the load 58, i.e. to a connection point connecting the second section 49 of the multilevel converter 46 to the second phase V of the load 58. The primary side of the transformer 60b is in this case connected firstly to the reference point 66 and secondly to a connection point or a phase connection connecting the third section 51 of the multilevel converter 46 to the third phase W of the load 58.

Accordingly, a first primary AC voltage is firstly tapped off from the second section 49 between the phase connection of the load 58 to be associated with the phase V and the reference point 66, is modulated with a first secondary AC voltage and is provided to the transformer 60a or to the primary side of the transformer 60a as a first resultant AC voltage. Further, a second primary AC voltage is tapped off from the third section 51 between the phase connection of the load 58 to be associated with the phase W and the reference point 66, is modulated with a second secondary AC voltage and is provided to the transformer 60b or the primary side thereof as a second resultant AC voltage. The first secondary AC voltage and the second secondary AC voltage are normally identical, i.e. the respective primary AC voltages provided by the sections 49 and 51 are modulated in the same manner, i.e. with an identical normally high-frequency signal. The first resultant AC voltage is transformed by the transformer 60a into a first outgoing AC voltage and converted into a first DC voltage by the rectifier 62a. The second resultant AC voltage is transformed by the transformer 60b into a second outgoing AC voltage and converted into a second DC voltage by the rectifier 62b. The interconnection of the rectifiers 62a and 62b provides the first DC voltage and the second DC voltage to the energy store 64. The multilevel converter 46 and the AC voltages $V_{u\text{-}v}$, $V_{u\text{-}w}$ and $V_{v\text{-}w}$ provided thereby produce a three-phase system. As a result, the potential of the reference point 66 is not clearly stipulated, but rather is normally merely arbitrarily adjusted to the neutral point voltage of the (in this case) three phase voltages, i.e. of the three AC voltages provided by the respective sections 47, 49 and 51, as a virtual star point. This degree of freedom is now used to perform a respective modulation of the first AC voltages, provided to the phases V and W of the load 58 via the two sections 49 and 51, with an identical normally high-frequency signal, i.e. a second AC voltage, and, at the same time, to produce at least partial compensation for the modulation, so that the high-frequency signal or the second AC voltage is essentially not visible to the load 58. Accordingly, approximately identical high-frequency signals can achieve extensive cancellation of the high-frequency signal at the connection points of the load 58 on the basis of the difference formation from the two high-frequency signals on the basis of the choice of connection points of the load 58.

Figure 3C:
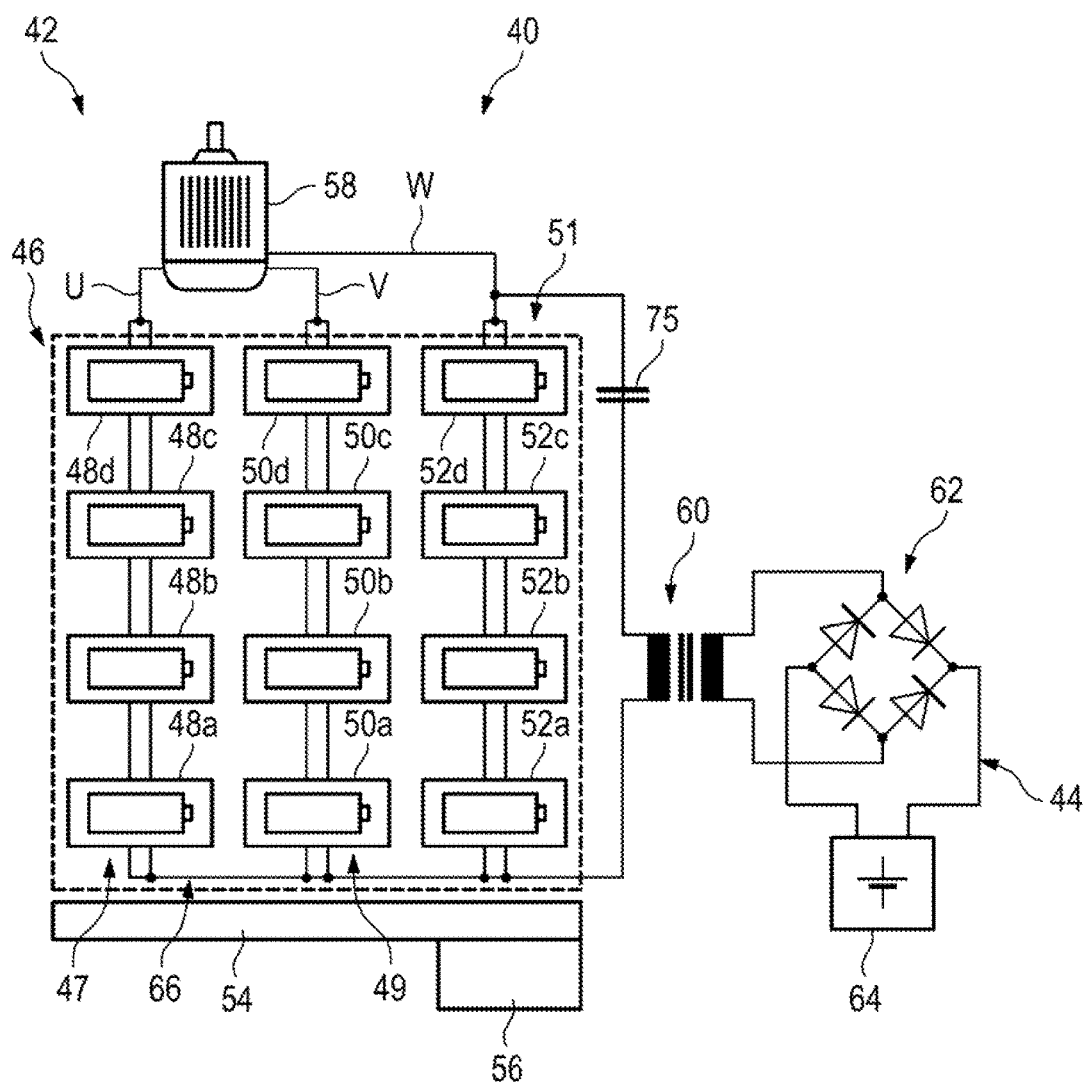
FIG. 3c shows a schematic depiction of fifth embodiment the power supply system according to the invention.

FIG. 3c schematically depicts a further embodiment. At least one capacitor 75 forms a series resonance with the transformer 60 by being electrically connected in series with the latter. The choice of electrical properties of the at least one capacitor 75 and of the transformer 60 can be made such that the resonant frequency is consistent with the frequency of the high-frequency signal and therefore the combination of the at least one capacitor 75 and the transformer 60 has a low electrical impedance at the frequency of the high-frequency signal, but has a high electrical impedance, preferably an electrical impedance higher at least by the factor 100, at the frequencies of the signals of the load 58. The electrical properties able to be chosen are preferably the inductance of the transformer 60 and the capacitance of the at least one capacitor 75.

Figure 4A:
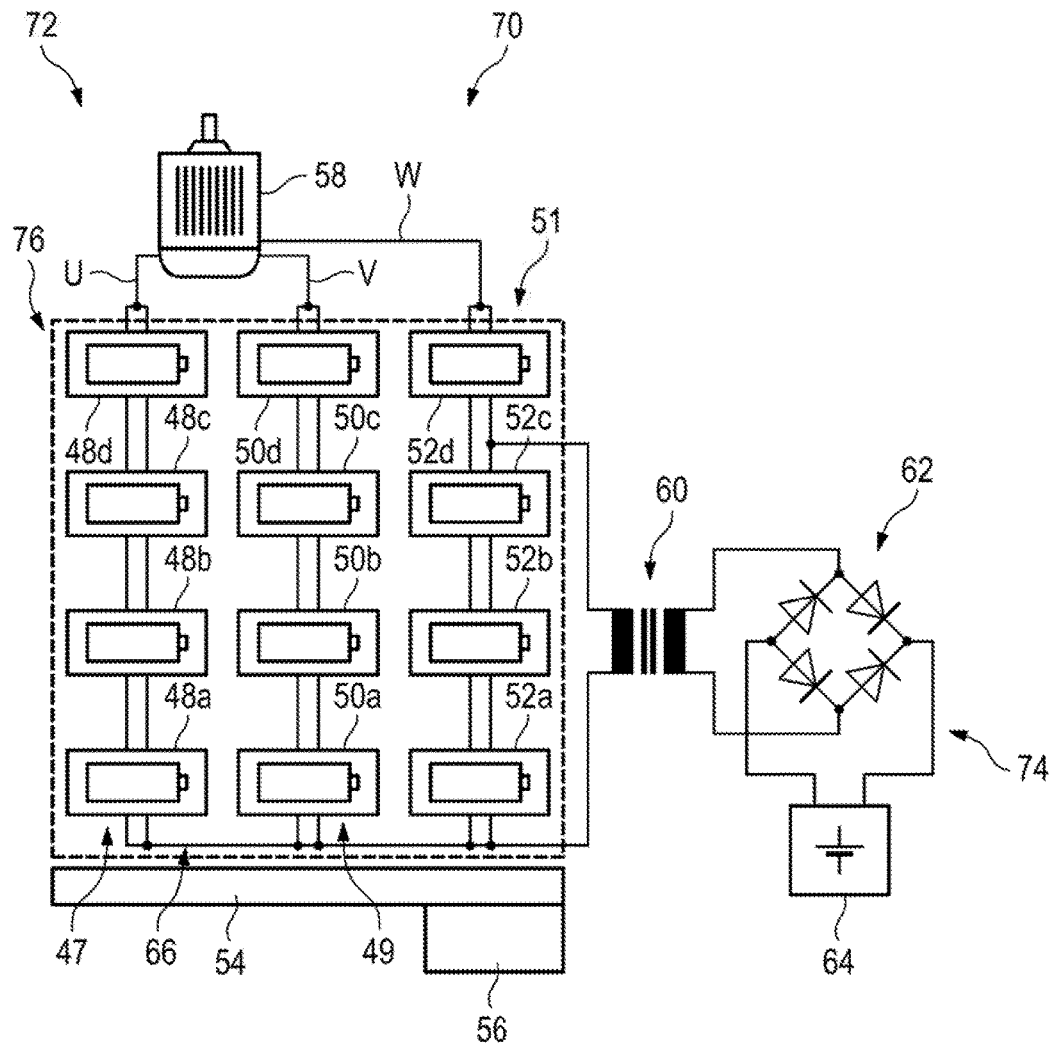
FIG. 4a shows a schematic depiction of a third embodiment of the power supply system according to the invention.

The third embodiment of the power supply system 70 according to the invention, depicted schematically in FIG. 4a, comprises a first subnetwork 72 and a second subnetwork 74. The first subnetwork 72 comprises a third embodiment of the multilevel converter 76 according to the invention. In this arrangement, there is provision for the third embodiment of the multilevel converter 76 to be configured to be largely of identical design to the second embodiment of the multilevel converter 46. Moreover, the two subnetworks 72, 74 of the second embodiment of the power supply system 70 according to the invention comprise the same components as the first embodiment of the power supply system 40 according to the invention from FIG. 3.

In this case too, the maximum amplitude having the first value for a respective phase U, V, W of the load 58 is provided by means of series and/or parallel connection of the single modules 48a, 48b, 48c, 48d, 50a, 50b, 50c, 50d, 52a, 52b, 52c, 52d of a respective section 47, 49, 51. Additionally, this at least one first or primary AC voltage has a second or secondary AC voltage modulated onto it whose amplitude has a lower second value. However, this second AC voltage has a higher frequency than the first AC voltage.

The third embodiment of the power supply system 70 differs from the first embodiment and second embodiment from FIG. 3 in that the primary side of the transformer 60 is connected to the reference point 66 between the two subnetworks 72, 74 and also to a connection between a third single module 52c and a fourth single module 52d of the third section 51 of the multilevel converter 46. This means that in this case a first AC voltage, onto which a second AC voltage is modulated, is tapped off only from a portion of the section 51. That is to say that a partial tap from the section 51 is effected in this case.

The third and fourth embodiments have the advantage that modulated AC voltages are produced only with a portion of the respective section 51, 49. This optionally permits the remaining modules 52d, 50d of the respective section that are not involved in producing modulated AC voltages to be actuated such that their voltages produce the respective inverse of the modulated AC voltages. Those modules of one section that are electrically between the at least two connection points of a transformer 60, 60a, 60b in the portion of the section may be involved producing modulated AC voltages. In this described control situation, the modulated AC voltages are not measurable or are measurable only at very low amplitude between the ends of the respective sections 51, 49. Consequently, any voltages modulated in this manner are also eliminated from the load 58.

Figure 4B:
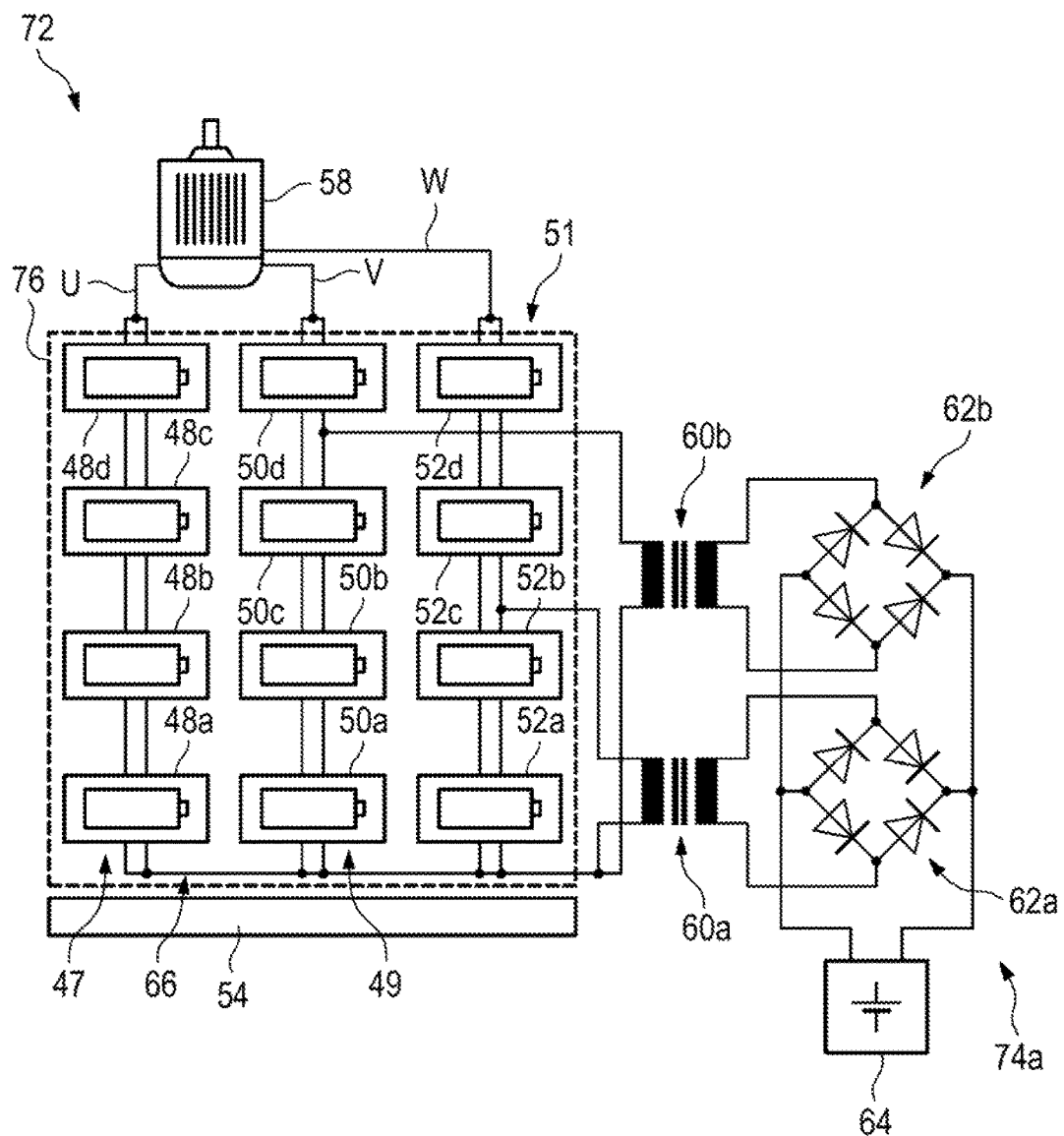
FIG. 4b shows a schematic depiction of a fourth embodiment of the power supply system according to the invention.

The power supply system depicted schematically in FIG. 4b comprises a first subnetwork 72 and a second subnetwork 74a. The first subnetwork 72 comprises a multilevel converter 76 configured to be of largely identical design to the multilevel converter 76 from FIG. 4a. The two subnetworks 42, 44a are in this case connected to one another via two DC isolating transformers 60a, 60b. In this case, the primary side of the transformer 60a is associated with the first subnetwork 42 and the secondary side of the transformer 60a is associated with the second subnetwork 74a. The primary side of the transformer 60b is likewise associated with the first subnetwork 42 and the secondary side of the transformer 60b is accordingly likewise associated with the second subnetwork 74a. Moreover, a rectifier 62a is connected downstream of the transformer 60a inside the second subnetwork 74a. A rectifier 62b is connected downstream of the transformer 60b inside the second subnetwork 74a. The rectifiers 62a, 62b are in this case connected in parallel with one another and connected to an energy store 64. Alternatively, it is also conceivable for the rectifiers 62a, 62b to be connected in series with one another. The interconnection of the rectifiers 62a, 62b among one another is provided on the basis of what DC voltage is supposed to be provided to the energy store 64 or what energy requirement there is for one or more loads in the second subnetwork, which are not depicted in this case.

Additionally, as also depicted in FIG. 4a, a reference point 66, in this case a star point, is defined for the multilevel converter. The primary side of the transformer 60a is in this case connected firstly to the reference point 66 and secondly to a connection point situated between the single module 52b and the single module 52c. Accordingly, only a partial tap from the section 51 is effected in this case. The primary side of the transformer 60b is connected firstly likewise to the reference point 66 and secondly to a connection point situated between the single module 50c and the single module 50d, so that only a partial tap from the section 49 is effected in this case too.

Accordingly, firstly a first primary AC voltage is tapped off from the third section 51 by means of a partial tap, is modulated with a first secondary AC voltage and is provided to the transformer 60a or to the primary side of the transformer 60a as a first resultant AC voltage. Further, a second primary AC voltage is tapped off from the second section 49 by means of a partial tap, is modulated with a second secondary AC voltage and is provided to the transformer 60b or the primary side of the transformer 60b as second resultant AC voltage. The first secondary AC voltage and the second secondary AC voltage are normally identical, i.e. the respective primary AC voltages tapped off from the sections 49 and 51 are modulated in the same way, i.e. with an identical normally high-frequency signal. The first resultant AC voltage is transformed into a first outgoing AC voltage by the transformer 60a and converted into a first DC voltage by the rectifier 62a. The second resultant AC voltage is transformed into a second outgoing AC voltage by the transformer 60b and converted into a second DC voltage by the rectifier 62b. The in this case parallel interconnection of the rectifiers 62a and 62b provides the first DC voltage and the second DC voltage to the energy store 64.

In a similar manner to that described in FIG. 3b, at least partial compensation for the modulation can be produced by means of a suitable respective modulation of the first AC voltages, provided by means of the two partial taps from the sections 49 and 51, with an identical normally high-frequency signal, i.e. a second AC voltage, so that the high-frequency signal or the second AC voltage is substantially not visible to the load 58.

Figure 4C:
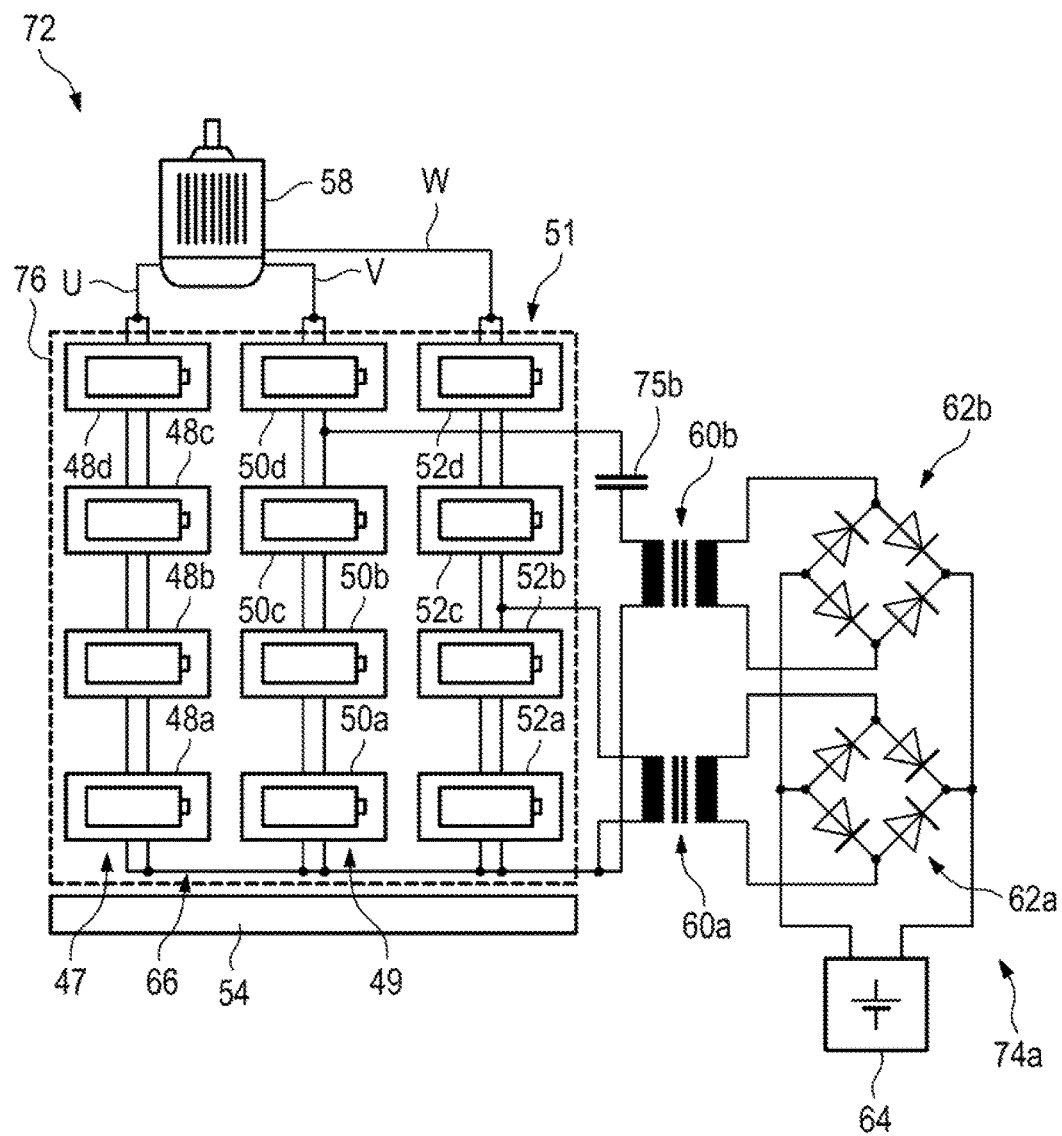
FIG. 4c shows a schematic depiction of a sixth embodiment of the power supply system according to the invention.

In FIG. 4c, at least one capacitor 75a, 75b is electrically connected in series with at least one of the transformers 60a, 60b according to the principle from FIG. 3c.

Figure 5A:
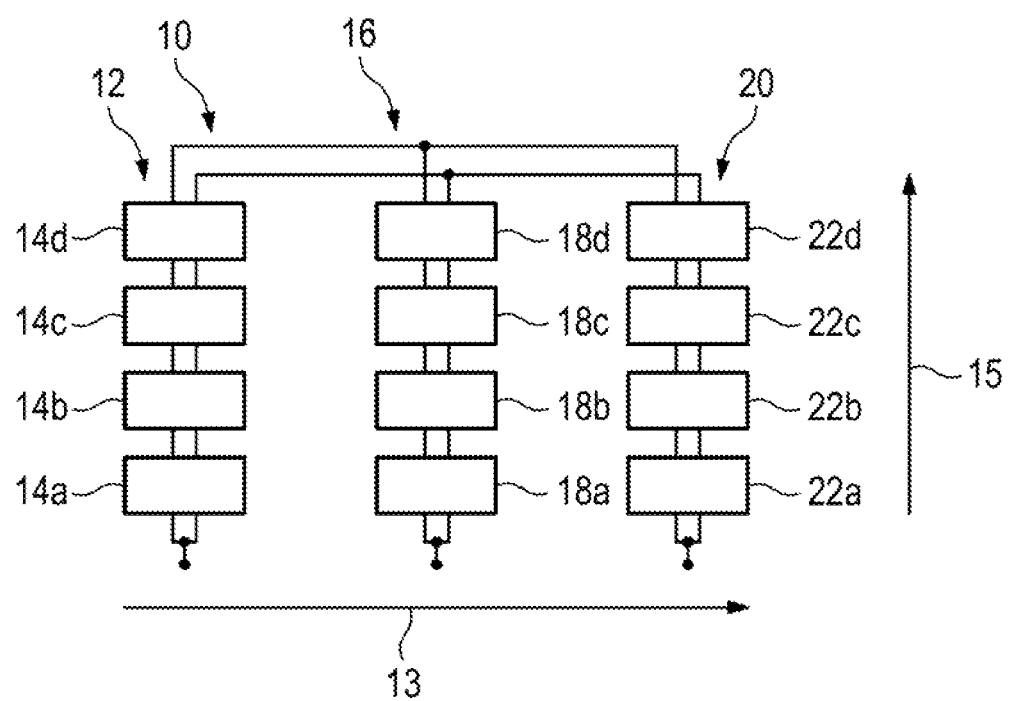
FIG. 5a shows a schematic depiction of the first embodiment of the multilevel converter according to the invention.

FIG. 5a shows the first embodiment of the multilevel converter 10 according to the invention, known from FIG. 2a.

In this case, FIG. 5a additionally shows a horizontal arrow 13 along which a phase-phase voltage of the multilevel converter 10 is obtained, which is in this case consistent with a voltage difference between the AC voltages between two respective sections 12, 16, 20. Along a vertically oriented arrow 15, a value of a respective first or primary AC voltage of a respective section 12, 16, 20 is obtained, which AC voltage is dependent on how many single modules 14a, 14b, 14c, 14d, 18a, 18b, 18c, 18d, 22a, 22b, 22c, 22d of a respective section 12, 16, 20 contribute to providing the respective first section-specific or phase-specific AC voltage on the basis of a series and/or parallel connection of the single modules 14a, 14b, 14c, 14d, 18a, 18b, 18c, 18d, 22a, 22b, 22c, 22d.

Figure 5B:
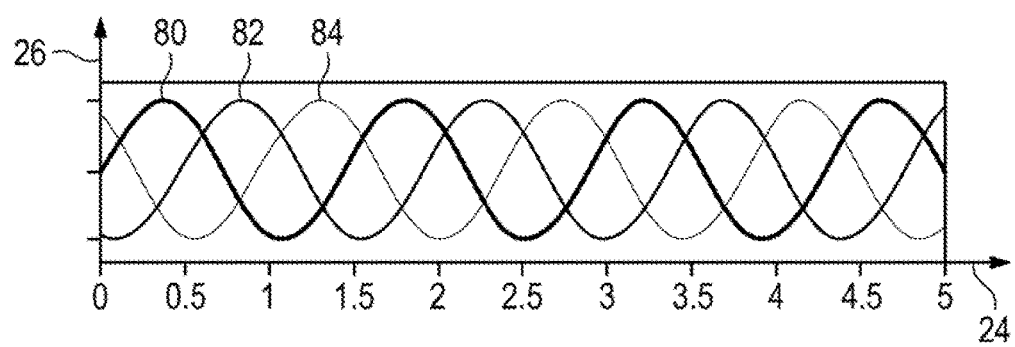
FIGS. 5b, 5c, 5d, and 5e are graphs in accordance with a further embodiment of the method according to the invention.
Figure 5C:
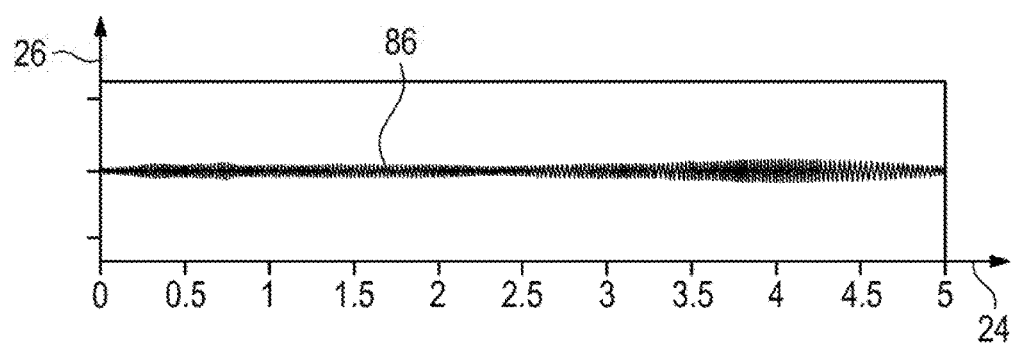
Figure 5D:
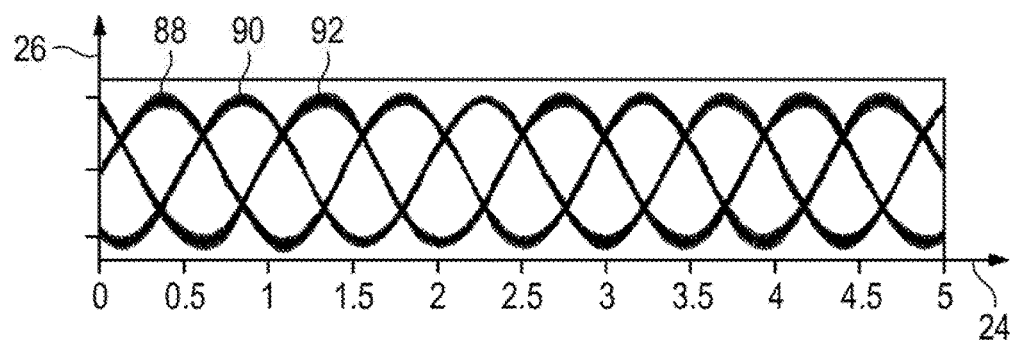

FIGS. 5b, 5c, 5d each comprise a graph having an abscissa 24, along which time is plotted, and an ordinate 26, along which values of a voltage are plotted. In this case, the first graph from FIG. 5b comprises a profile 80 of a first primary AC voltage or phase able to be provided by connecting, i.e. by connecting in series and/or parallel, the single modules 14a, 14b, 14c, 14d of the first section 12 of the multilevel converter. A second profile 82 represents a second primary AC voltage or phase of the multilevel converter 10 that is provided by means of the second section 16 thereof having the single modules 18a, 18b, 18c, 18d. A third profile 84 shows a third primary AC voltage or phase that is provided by connecting the single modules 22a, 22b, 22c, 22d of the third section 20 of the multilevel converter 10. In this case, these three primary and hence first AC voltages have the same frequency and the same amplitude. Moreover, these primary AC voltages are phase shifted through 120° relative to one another.

The graph from FIG. 5c shows a profile 86 of a second or secondary AC voltage, which is in turn modulated onto the three primary AC voltages.

Profiles 88, 90, 92 of voltages resulting therefrom, in this case resultant AC voltages, are depicted in the graph from FIG. 5d.

In this case too, there is provision for the multilevel converter 10 to be arranged in a first subnetwork, which likewise has a three-phase load to which the three primary AC voltages are provided. Additionally, this subnetwork is connected to a second subnetwork via at least one transformer, a value of the amplitude of the voltage inside the first subnetwork being greater than the value of the amplitude of the voltage in the second subnetwork.

Figure 5E:
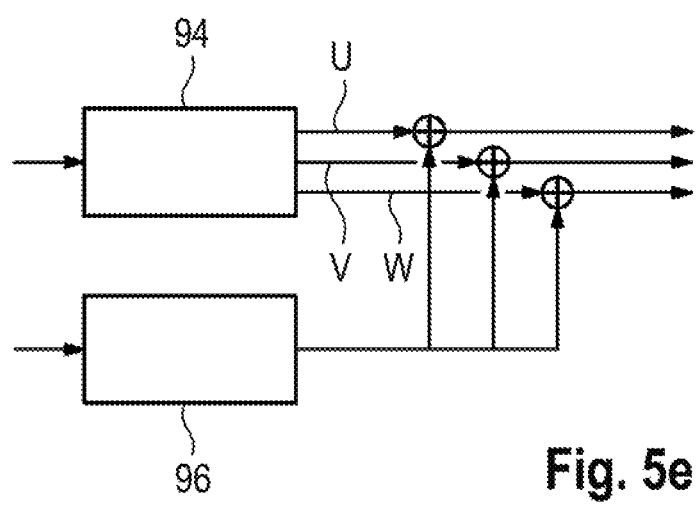

FIG. 5e shows a schematic depiction of a controller or machine regulator 94 for a load or an electrical machine of the first subnetwork, the three phases U, V, W of which are able to be used by the multilevel converter 10 to provide the three primary AC voltages, the profiles 80, 82, 84 of which are depicted in FIG. 5b. In this case, the first phase U is associated with the first section 12, the second phase V is associated with the second section 16 and the third phase W is associated with the third section 20 of the multilevel converter 10. Additionally, a control unit 96 of the multilevel converter 10 produces the second or secondary AC voltage, in this case a high-frequency signal having a temporally variable amplitude and/or frequency, for example for power control, the profile 86 of which is shown in the graph from FIG. 5c. This second AC voltage is added to the three first AC voltages and provided to the load, in this case an electrical machine.

Therefore, the control unit 94, when performing regulation of the electrical machine, provides the first phase-specific AC voltages U, V, W and phase-specific currents. (Alternatively, it is possible for this control unit 94 to be associated with the multilevel converter 10 and configured to monitor operation of the electrical machine and to set the AC voltages and/or currents on the basis thereof.)

The control unit 96, which is configured for controlling a DC voltage transformer of the multilevel converter 10, inter alia, produces the high-frequency second AC voltage having a temporally variable amplitude and/or frequency, which is provided for regulating a power for loads in the second subnetwork, for example. Since the second AC voltage is modulated onto all three first AC voltages or phases, it is not visible to the load or electrical machine in the first subnetwork. The second AC voltage is at the same time consistent with a difference between a reference point of the load or of the electrical machine and a reference point of the multilevel converter 10, the respective reference points usually being configured as star points in the case of a star winding.

The invention claimed is:

1. A multilevel converter configured to be arranged in an electrical network, wherein the electrical network comprises a first subnetwork and a second subnetwork, wherein the two subnetworks are configured to be connected to one another via at least one transformer and are configured to be DC isolated from one another by said transformer, wherein a primary side of the at least one transformer having a first number of turns is configured to be assigned to the first subnetwork and a secondary side of the at least one transformer having a second number of turns is configured to be assigned to the second subnetwork, wherein the multilevel converter is configured to be arranged in the first subnetwork, the multilevel converter comprising:
  a plurality of single modules, wherein each single module has an electrical energy store, wherein the multilevel converter is configured to provide at least one first AC voltage and to modulate it with at least one second AC voltage, wherein accordingly at least one AC voltage resulting therefrom is provided to the at least one transformer and is transformed by the at least one transformer into at least one outgoing AC voltage and is provided to the second subnetwork; and
  at least one associated additional energy store configured to provide the at east one second AC voltage.

2. The multilevel converter as claimed in claim 1, further comprising:
  a control unit configured to set values of at least one physical parameter of at least one of the at least one first AC voltage or of the at least one second AC voltage.

3. The multilevel converter as claimed in claim 1, which is configured to connect at least two single modules at least one of in series or in parallel with one another, and to provide the at least one first AC voltage from a combination of single voltages of the at least two single modules to be combined with one another.

4. The multilevel converter as claimed in claim 1, which has multiple sections, wherein each section has a combination of multiple interconnected single modules, wherein each section produces a respective first AC voltage.

5. The multilevel converter as claimed in claim 4, which is configured to provide the at least one first AC voltage at least one of by means of a full tap from at least one section or by means of a partial tap from at least one section with reference to a reference point of the multilevel converter and to modulate it with the at least one second AC voltage.

6. The multilevel converter as claimed in claim 4, which is configured to use the multiple sections to provide multiple first AC voltages phase shifted relative to one another and to modulate each of them with the at least one second AC voltage to produce accordingly multiple resultant AC voltages.

7. The multilevel converter as claimed in claim 6, which is configured to modulate a respective instance of the multiple first AC voltages with the at least one second AC voltage between a respective phase connection of the multilevel converter for a load in the first subnetwork and the reference point of the multilevel converter.

8. The multilevel converter as claimed in claim 4, in which the reference point is consistent with a star point of the multilevel converter.

9. The multilevel converter as claimed in claim 6, which is configured to provide a respective resultant AC voltage from the multiple resultant AC voltages to a respective transformer from multiple transformers, which transforms the respective resultant AC voltage into a respective outgoing AC voltage.

10. The multilevel converter as claimed in claim 1, in which energy stores of the single modules are configured as DC voltage sources, wherein the multilevel converter has at least one converter that is configured to convert a single voltage, configured as a DC voltage, of an energy store of at least one single module into an AC voltage and to provide the at least one first AC voltage therefrom.

11. An electrical network for use with a power supply system, the electrical network comprising:
  a first subnetwork;
  a second subnetwork; and
  at least one transformer connecting the first subnetwork to the second subnetwork and DC isolating the subnetworks from one another, wherein a primary side of the at least one transformer having a first number of turns is associated with the first subnetwork and a secondary side of the at least one transformer having a second number of turns is associated with the second subnetwork, wherein the first subnetwork has a multilevel converter having a plurality of single modules, wherein each single module has an electrical energy store, wherein the multilevel converter is configured to provide at least one first AC voltage and to modulate it with at least one second AC voltage, wherein at least one AC voltage resulting therefrom is provided to the at least one transformer, wherein the at least one transformer is configured to transform the at least one resultant AC voltage into at least one outgoing AC voltage and to provide it to the second subnetwork;
  wherein the electrical network is arranged in a motor vehicle and in which an electrical machine is assigned to the first subnetwork as a load.

12. The electrical network as claimed in claim 11, in which the first number of turns on the primary side of the transformer is greater than the second number of turns on the secondary side of the transformer.

13. The electrical network as claimed in claim 11, further comprising:
  at least one rectifier that is configured to convert the at least one outgoing AC voltage into at least one DC voltage.

14. The electrical network as claimed in claim 11, which is configured to provide multiple first AC voltages and to modulate each of the multiple first AC voltages with at least one second AC voltage to produce multiple resultant AC voltages, wherein the electrical network comprises multiple transformers, wherein a respective transformer is configured to transform a respective one of the multiple resultant AC voltages into a respective outgoing AC voltage, and wherein the electrical network further comprises multiple rectifiers connected downstream of the multiple transformers, wherein a respective rectifier is configured to convert a respective outgoing AC voltage from a respective transformer into a respective DC voltage, wherein the multiple rectifiers are interconnected among one another such that they can be used to convert the respective DC voltages into a total voltage.

* * * * *